(12) United States Patent
Rogalla et al.

(10) Patent No.: US 7,654,788 B2
(45) Date of Patent: Feb. 2, 2010

(54) DEVICE FOR MOUNTING A PNEUMATIC TIRE ONTO A VEHICLE WHEEL RIM

(75) Inventors: Martin Rogalla, Darmstadt (DE); Werner Lehr, Modautal (DE)

(73) Assignee: Schenck RoTec GmbH, Darmstadt (DE)

( * ) Notice: Subject to any disclaimer, the term of this patent is extended or adjusted under 35 U.S.C. 154(b) by 45 days.

(21) Appl. No.: 11/985,896

(22) Filed: Nov. 19, 2007

(65) Prior Publication Data

US 2008/0128093 A1 Jun. 5, 2008

(30) Foreign Application Priority Data

Dec. 1, 2006 (DE) .................. 10 2006 057 171

(51) Int. Cl.
*B25J 15/00* (2006.01)
(52) U.S. Cl. .................. 414/739; 414/729; 294/106; 901/31
(58) Field of Classification Search .................. 414/739, 414/729; 294/106; 901/31; 157/1.1, 1.2, 157/11
See application file for complete search history.

(56) References Cited

U.S. PATENT DOCUMENTS

| | | | |
|---|---|---|---|
| 4,858,979 A * | 8/1989 | Parma | .................. 294/106 |
| 5,267,380 A | 12/1993 | Ronge et al. | |
| 6,626,476 B1 | 9/2003 | Govzman et al. | |
| 7,201,203 B2 | 4/2007 | Rogalla et al. | |
| 2007/0000616 A1 | 1/2007 | Rogalla et al. | |

FOREIGN PATENT DOCUMENTS

| | | |
|---|---|---|
| DE | 35 21 821 | 1/1987 |
| DE | 40 03 848 | 8/1991 |
| DE | 91 03 506 | 8/1991 |
| DE | 102 56 870 | 6/2004 |
| DE | 10 2005 001 212 | 7/2006 |
| DE | 10 2005 030 692 | 1/2007 |
| JP | 53-018165 | 2/1978 |
| JP | 4-159092 | 6/1992 |

OTHER PUBLICATIONS

European Search Report dated Mar. 12, 2008 with English translation of relevant portions.

* cited by examiner

*Primary Examiner*—Donald Underwood
(74) *Attorney, Agent, or Firm*—Collard & Roe, P.C.

(57) ABSTRACT

A device for mounting a pneumatic tire onto a vehicle wheel rim comprises a handling robot, including a robot hand (7), which is movable about a plurality of axes and comprises a rotationally drivable flange (8) and a gripper (2) attached thereto, the gripper including a base element (10) and at least two gripper arms (15) which are movable radially relative to the centre axis of the gripper (2). The gripper arms (15) are coupled to a synchronization device, which synchronizes the radial movement of the gripper arms (15) and includes a disc (23), mounted on the base element (10) of the gripper (2) so as to be rotatable about the centre axis of the gripper and rotationally drivable via a motor, and coupling members (25) fixed to the disc (23) and the gripper arms (15) via hinged joints (26,27) in such a way that a rotation of the disc (23) produces a synchronous radial movement of the gripper arms (15).

5 Claims, 4 Drawing Sheets

DEVICE FOR MOUNTING A PNEUMATIC TIRE ONTO A VEHICLE WHEEL RIM

FIELD OF THE INVENTION

The invention relates to a device for mounting a pneumatic tire onto a vehicle wheel rim, comprising a handling robot including a robot hand, which is movable about a plurality of axes and comprises a rotationally drivable flange, and comprising a gripper which is attached to the robot hand and includes a base element and at least two gripper arms which are movable radially relative to the centre axis of the gripper, the gripper arms being coupled to a synchronization device which synchronizes the radial movement of the gripper arms.

BACKGROUND OF THE INVENTION

A method for automatically mounting pneumatic tires onto wheel rims using a handling robot has already proved to be very advantageous and is the subject-matter of patent application DE 10 2005 030 692.6. With this method the handling and mounting of the pneumatic tires takes place with the aid of a gripper that is attached to the pivoting arm or to the robot hand of the handling robot and which can grip and hold the pneumatic tires in a suitable manner. In this context it has already proved to be advantageous if the pneumatic tires are gripped at the outer circumference in the region of the tread by the gripper and if the pneumatic tire is supported at the gripper on a side wall. It is furthermore necessary for the gripper fingers or arms which surround the pneumatic tire to be moved synchronously towards and away from one another in such a way that the gripped pneumatic tires always pass in a defined centre position with respect to the gripper and thus also with respect to the robot hand. Furthermore, it should be possible to grip pneumatic tires with different outer diameters. Therefore, the gripper should be able to be used in a wide diameter range. The gripping movement of the gripper should take place as quickly as possible and the forces on the wheel holder should be variable.

SUMMARY OF THE INVENTION

The object of the invention is to provide a device of the type mentioned in the introductory section, which meets the aforementioned requirements and is characterized by a reliable mode of operation and a simple and cost-effective construction.

The object is achieved by the features according to the invention. Advantageous developments are discussed below.

According to the invention, the synchronization device includes a disc mounted on the base element of the gripper so as to be rotatable about the centre axis of the gripper and rotationally drivable via a motor, and coupling members which are fixed to the disc and the gripper arms via hinged joints in such a way that a rotation of the disc produces a synchronous radial movement of the gripper arms. This configuration effects, by simple means, a drive of the gripper arm which can be particularly advantageously integrated in a conventionally configured handling robot. The synchronization device is made up of simple, cost-effective components and is well-suited for transferring the necessary clamping forces. By using coupling members with hinged joints, a durable and low-maintenance operation is ensured.

Particularly advantageous is a development of the device according to the invention, in which the disc is fixed to the rotationally drivable flange of the robot hand and the base element of the gripper is non-rotationally supported on the housing of the robot hand. The gripper arm is thus driven by the drive generally referred to as shaft in the robot hand of the handling robot, which drive is conventionally disposed for rotating the devices arranged at the robot hand. The flange of the robot hand is provided with an actuator and can be moved into any desired rotational angle position by means of said actuator and can be locked in said position. This drive can be programmed freely in such a way that precisely measured clamping movements of the gripper are possible. The configuration has the further advantage that the robot hand is not loaded by the weight of an additional drive and that no additional power and control cables have to be fed to the gripper arranged at the end of the robot arm. The drive of the gripper by the robot axis further facilitates a very compact and easy construction of the gripper in such a way that the space needed for the gripper, for example in the region of the mounting station is comparatively small.

According to a further proposal of the invention, the base element of the gripper may alternatively be fixed to the rotationally drivable flange of the robot hand, and the disc, which is rotatably mounted on the base element, is rotationally drivable by a separate motor fixed to the base element. This configuration foregoes certain advantages of the solution discussed above, but instead offers the possibility of rotating the gripper, and thus the tire which it is holding, about its rotational axis. This is necessary, for example, if the tire is to be mounted on the wheel rim in a defined angle position for uniformity matching. This function can be carried out with the aid of the device according to the invention, the device being, however, more expensive. The higher cost of construction is, however, justified as a separate matcher does not have to be used.

According to the invention it can further be provided for each gripper arm to include two parallel links, which are each connected pivotally at one end to the base element and at the other end to a gripper finger via swivel joints in such a way that the links form a parallel guide of the gripper finger. The gripper fingers, which are oriented, for example, parallel to the centre axis of the gripper, thus maintain their parallel orientation independently of the diameter of the tire that is gripped and are supported across their entire surface at the tread of the tire. The configuration also enables a gripper of low weight and avoids problems with friction and maintenance which were associated with a rectilinear guiding of the gripper fingers.

Preferably, a link of the gripper arm is connected at each end respectively to, on the one hand, the base element and, on the other hand, to a gripper finger by two coaxial swivel joints arranged at a distance from one another, the axes of the swivel joints being oriented tangentially to the centre axis of the gripper. This embodiment enables a torsion-proof connection between the gripper fingers and the base element of the gripper. According to the invention, the gripper fingers may have retaining plates which are parallel to the centre axis of the gripper and which are constructed so as to contact the tread of the pneumatic tire. Furthermore, contact surfaces arranged in a common radial plane may be provided to support the gripper fingers on the side wall of the pneumatic tires.

According to a further proposal of the invention, the closing path produced by a drive for rotating the disc may be positioned to press the gripper finger onto a pneumatic tire which it is holding. By adjustment of the closing path, the closing force can be limited to a level permissible for the respective tire size.

BRIEF DESCRIPTION OF THE DRAWINGS

The invention will be described hereinafter in more detail with reference to embodiments that are represented in the drawings, in which.

DETAILED DESCRIPTION OF THE PREFERRED EMBODIMENTS

Figure 1:
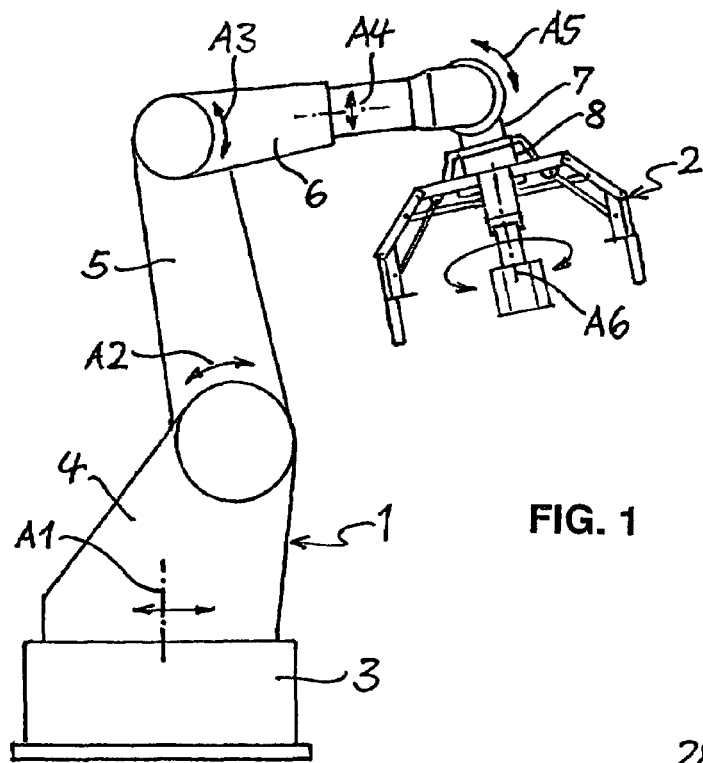
FIG. 1 is a side view of a device for mounting pneumatic tires according to the invention.

The device illustrated in FIG. 1 comprises a handling robot 1 and a gripper 2 which can be moved by said robot and which grips and holds pneumatic tires during the mounting thereof onto a wheel rim. The handling robot 1 consists of a fixed base frame 3, on which a carousel 4 with an oscillating crank 5, an arm 6 and a robot hand 7 rotates about a vertical axis A1. The oscillating crank 5 can be rotated on the carousel 4 about a horizontal axis A2 and the arm 6 can be rotated on the oscillating crank 5 about a horizontal axis A3. The arm 6 consists of two parts, which can be rotated relative to one another about an axis A4 extending in the longitudinal direction of the arm 6. The robot hand 7 is connected to the arm 6 rotatably about an axis A5 extending transversely to the longitudinal axis of the arm 6. At its free end, the robot hand 7 comprises a flange 8 which can be rotated about an axis A6. All axes A1 to A6 of the handling robot 1 can be driven by controlled servomotors. Brakes and resolvers for measuring the angle of rotation are integrated into the servomotors. The robot is equipped with a freely-programmable control unit, by which means each of the aforementioned axes can be individually moved into a desired rotational angle position and can be locked in said position.

Figure 2:
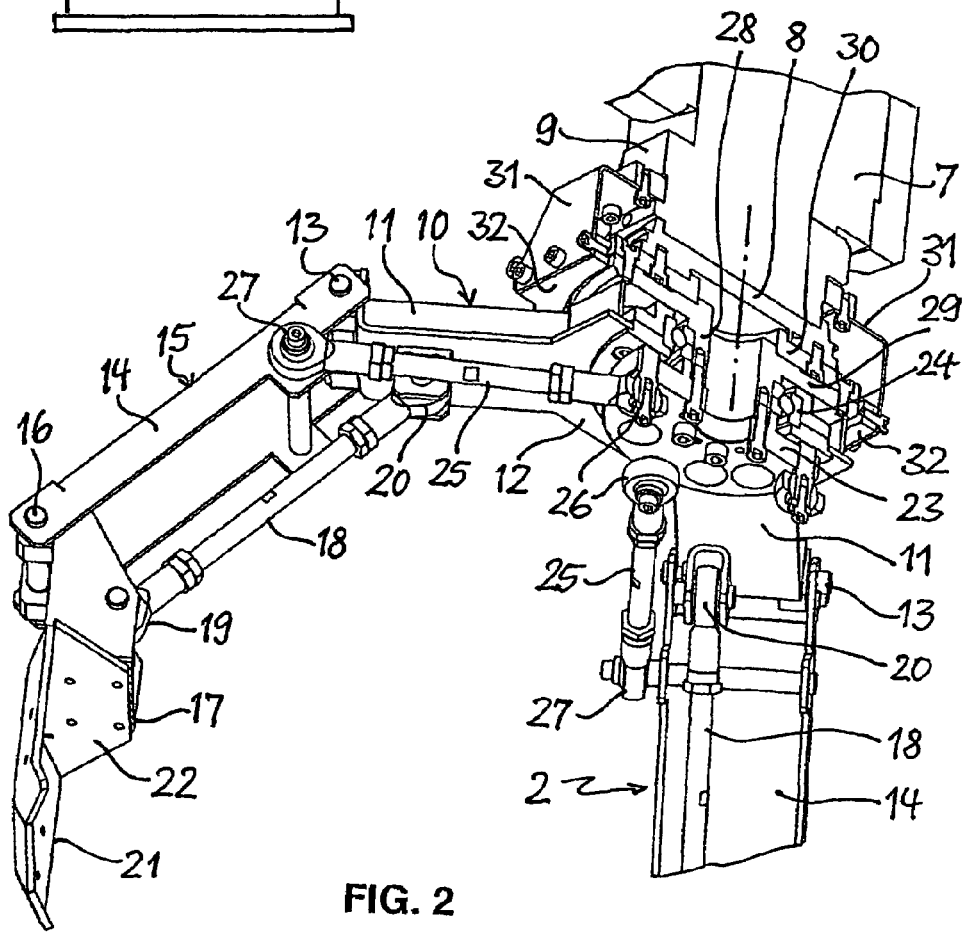
FIG. 2 shows a detail of the gripper of the device according to FIG. 1, partly cut away.
Figure 3:
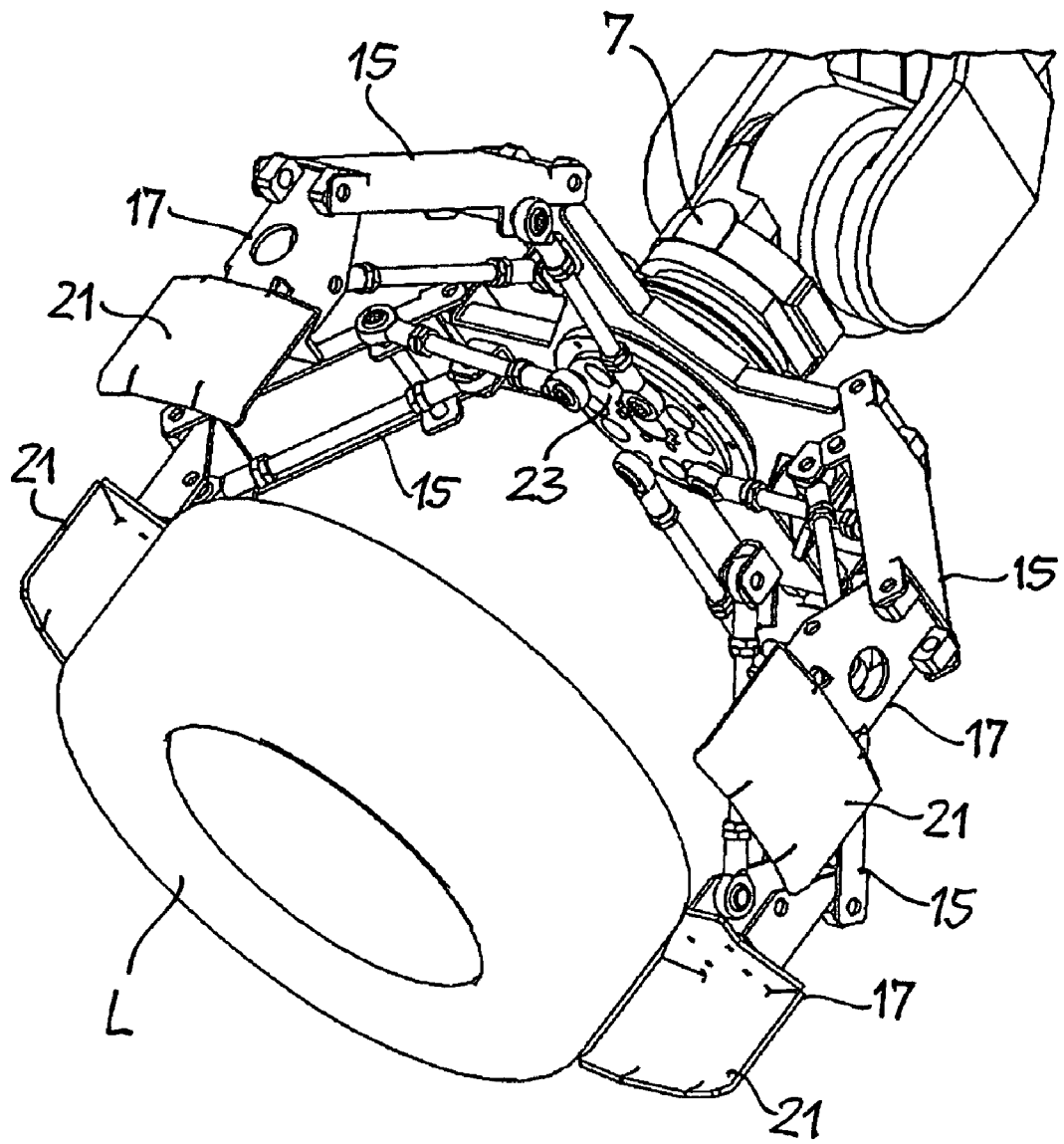
FIG. 3 is a view of the gripper according to FIG. 2 in an open position.
Figure 4:
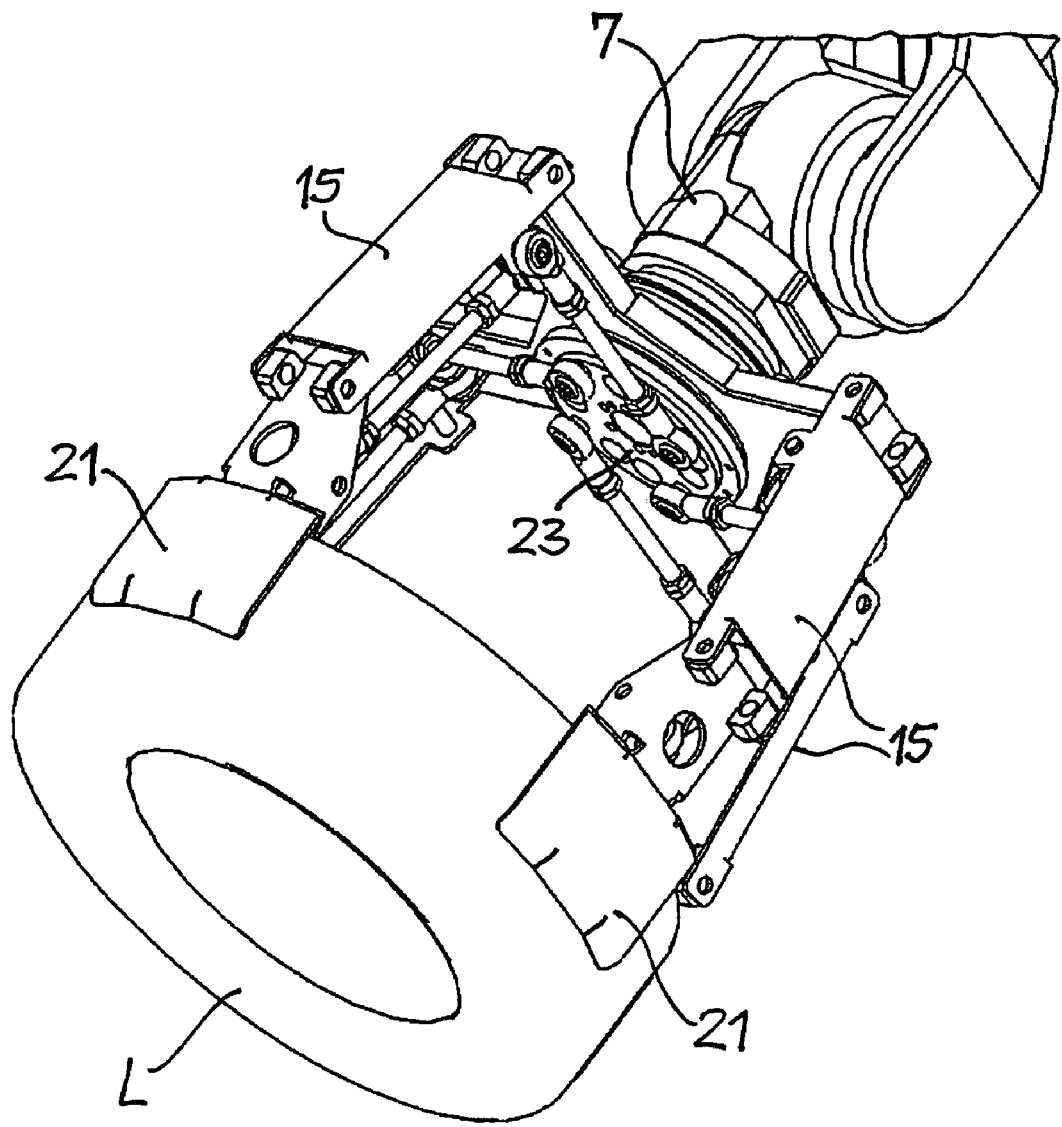
FIG. 4 is a view of the gripper according to FIG. 2 in a closed position.

The gripper 2 which is clearly illustrated in FIG. 2 to 4 has a cross-shaped base element 10 with four arms 11 which extend radially outwardly from a central annular element 12. At the radially outer ends of the arms 11, outer links 14 of the gripper arms 15 are pivotally mounted by means of two coaxial swivel joints 13 which are arranged at a distance from one another. At the opposite ends of the links 14, gripper fingers 17 are pivotally mounted by means of two swivel joints 16 which are arranged at a distance from one another. The axes of the swivel joint 13 and of the swivel joint 16 of each of the links 14 are parallel and extend perpendicular to a radial plane dividing the respective gripper arm. On the side of the links 14 which is turned toward the centre of the gripper, there are arranged at a parallel distance therefrom inner links 18 which are connected at one end to a gripper finger 17 by a swivel joint 19 and at the other end to an arm 11 by a swivel joint 20. The distance of the swivel joint 19 from the axis of the swivel joint 16 is the same as the distance of the swivel joint 13 from the axis of the swivel joint 13. Furthermore, the distance of the swivel joints 19, 20 is substantially the same as the distance of the axes of the swivel joints 13 and 16. The links 14, 18 thus form a pivotal parallel guide by means of which the gripper finger 17 connected to the links maintains its aforementioned orientation to the centre axis of the gripper 2 during the opening and closing thereof. The gripper fingers 17 each have a retaining plate 21 which is oriented parallel to the centre axis of the gripper and which is constructed so as to contact the tread of the pneumatic tire. A contact surface 22 extends radially inward from the retaining plate 21 and perpendicularly thereto, by means of which contact surface the gripper can be supported on a side wall of the pneumatic tire.

The gripper arms must be moved synchronously from or towards one another in order to open and close the gripper. To achieve this synchronous movement, a rotatable disc 23 is provided which is rotatably mounted in the central opening of the annular element 12 by a four-point rolling contact bearing 24. The disc 23 is connected to each gripper arm 15 by a rod-shaped coupling member 25. The coupling members 25 are equally long and have at their ends hinged joints 26, 27 with at least two degrees of freedom, in particular ball-and-socket joints. The coupling members 25 are fixed to the disc 23 with the hinged joint 26. The hinged joints 26 are, in this case, arranged with an angular separation of 90° and at the same distance from the rotational axis of the disc 23. The coupling members 25 are fixed to the outer links 14 at a distance from the axis of the swivel joint 13 by means of the hinged joints 27. If the disc 23 is rotated, the coupling members 25 move in a radial direction relative to the adjacent arms 11 of the base element 10, whereby the gripper arm 15 mounted on the arms 11 pivots in the corresponding direction.

The disc 23 is arranged on a side of the annular element 12 and screwed to a hub 28 of an annular flange 29 arranged on the other side of the annular element 12. The hub 28 penetrates the inner ring of the four-point rolling contact bearing 24 and is rotatably mounted thereby. The annular flange 29 is rigidly connected to the rotationally drivable flange 8 of the robot hand 7 by an intermediate ring 30. The disc 23 and the flange 8 thus form a kinematic unit which transfers rotational forces.

In order that the disc 23 can be rotated by rotating the flange 8 relative to the base element 10, the base element 10 must be non-rotationally connected to the housing 9 of the robot hand 7. For this purpose, there are arranged on opposite sides of the housing 9 two torque supports 31 which connect the housing 9 to a part 32 which surrounds the annular flange 29 and is a rigid component of the annular element 12.

In order to grip a tire, the gripper 2, as illustrated in FIG. 3, is moved into an open position by controlled rotation of the disc 23 using the servo drive for the flange 8, in which position the distance between the retaining plates 21 which face one another is greater than the outer diameter of the pneumatic tire L to be gripped which, conventionally, rests on a support (not illustrated). By means of the parallel guide of the gripper fingers 17, the retaining plates 21 are oriented parallel to the centre axis of the gripper independently of the opening position of the gripper 2 in such a way that they can rest uniformly on the circumferential surface of the tire L. In order to bring the retaining plates 21 into contact with the tire, the disc 23 is rotated in a clockwise direction by the drive in the robot hand 7 as illustrated. The gripper arms 15 thus move synchronously in the direction of the centre axis of the gripper 2 until they reach a position in which the retaining plates 21 contact the pneumatic tire L as illustrated in FIG. 4. In order to achieve the correct pressing force for holding the pneumatic tire L, the control unit of the servomotor of the robot hand 7 is programmed in such a way that, when the gripper arms 15 are in the end position, the diameter between the retaining plates 21 is smaller by a defined value than the outer diameter of the pneumatic tire L. The desired retaining force thus results from the deformation resistance with which the pneumatic tire L opposes the retaining plates when said retaining plates elastically deform the tire to the smaller diameter when they move. The disclosed manner in which the desired retaining force is to be achieved requires no elaborate measuring devices as the size of the tires which are to be held by the gripper is established in each case in advance of the mounting of the tire and is taken into consideration during programming of the mounting process. The necessary measurement of the diameter shortfall can be empirically determined for the respective tire size and is then fixed for all subsequent mounting procedures.

The disclosed device has the advantage that an existing servo drive of a conventional handling robot can be used for a gripping movement. The material costs of the device are therefore low and the cost of mounting is marginal. The device is not prone to wear as there is no need for a cable feed to the gripper and thus no danger of fatigue fracture. The gripper to be moved by the robot hand does not weigh much due to the omission of an additional drive and does not require any additional installation space.

Figure 5:
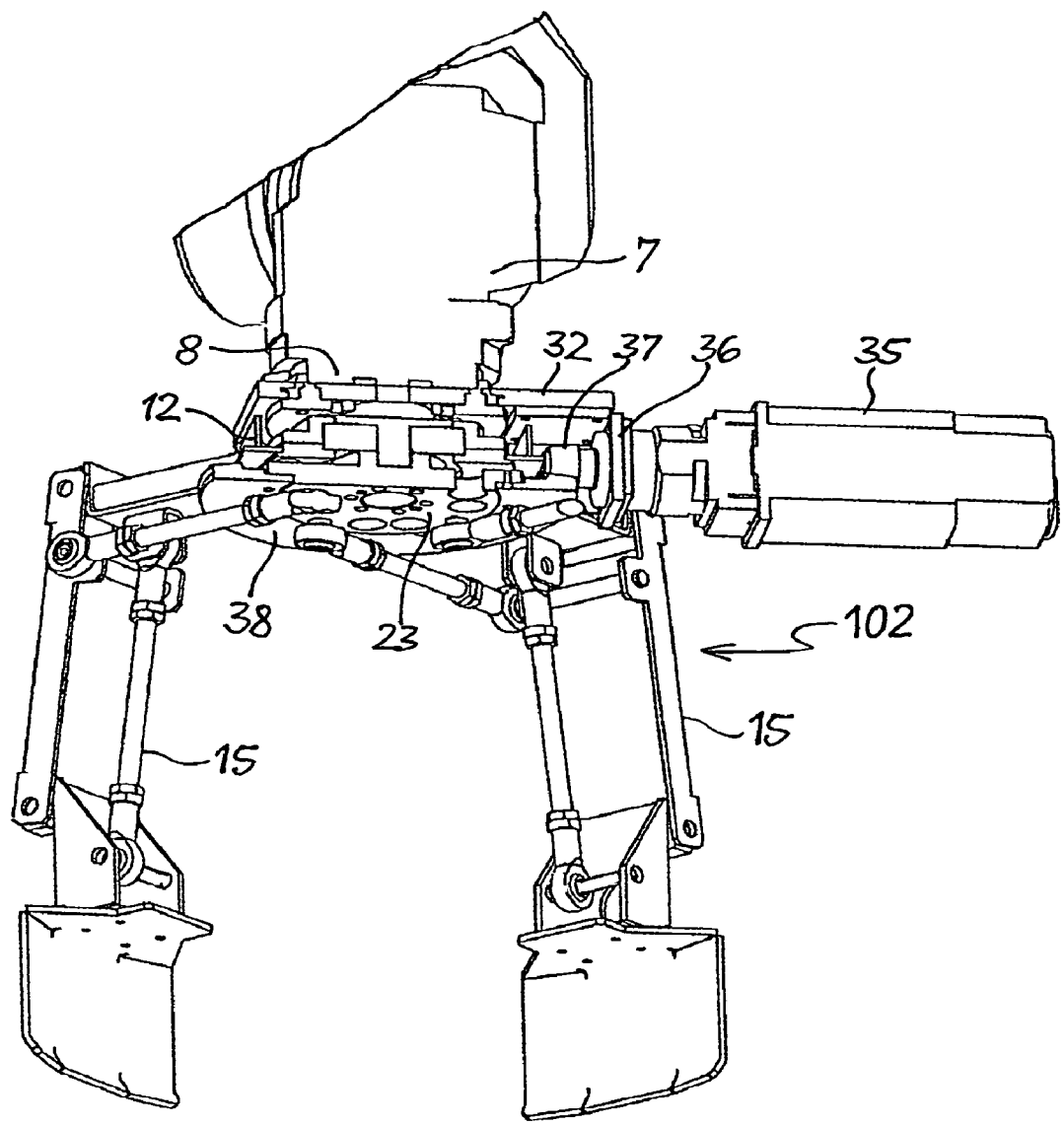
FIG. 5 shows a further embodiment of a gripper for a device according to the invention.

In the embodiment illustrated in FIG. 5 a gripper 102 is arranged on the robot hand 7 in such a way that it can be rotated relative to the robot hand 7. This allows the possibility of rotating a pneumatic tire about its rotational axis into a specific rotational angle position during mounting with the aid of the gripper 102 in order to align the matching points marked on the tire and on the wheel rim with one another. The matching point marked on the pneumatic tire denotes the maximum of the first harmonic radial force variation and that on the wheel rim the deepest position of the radial run-out. If, during mounting, the matching points on the tire and wheel rim are brought to one another the true running properties of the mounted tire will be optimal.

In order to be able to precisely position a pneumatic tire with regard to the rotational angle with the aid of the gripper 102 the annular element 12 of the gripper 102 is, as shown in the embodiment according to FIG. 5, fixed to the part 32 at the flange 8 of the robot hand 7. The gripper 102 can thus be rotated into the respective position necessary for matching with the aid of the servomotor, which can be moved into any desired rotational angle position of the robot hand 7. This leads to the servomotor of the robot hand 7 no longer being able to be used to drive the gripper arm 15. The gripper 102 is therefore equipped with an independent drive. The drive consists of a servomotor 35 which is fixed to a support 36 on the part 32 of the annular element 12. The servomotor 35 drives a bevel gear 37 via an integrated transmission, which bevel gear is engaged with a crown gear 38 which is fixed to the disc 23. The servomotor 35 is connected to the control unit of the handling robot by power supply cables and signal lines in such a way that the opening and closing of the gripper 102 can be controlled via said cables and lines.

Though the device according to FIG. 5 foregoes certain advantages of the device according to FIGS. 1 to 4 it instead offers an additional function which can replace a matcher.

What is claimed is:

1. A device for mounting a pneumatic tire onto a vehicle wheel rim comprising:
   (a) a handling robot including a robot hand, said robot hand comprising a rotationally drivable flange;
   (b) a gripper attached to the robot hand, said gripper including a base element connected non-rotationally to the robot hand and at least two gripper arms pivotally mounted to the base element;
   (c) a synchronization device coupled to said at least two gripper arms, said synchronization device comprising a disc mounted on the rotationally drivable flange so as to be rotatable about a center axis of the gripper;
   (d) a motor for rotationally driving the disc; and
   (e) coupling members fixed to the disc and at least two gripper arms via hinged joints;
   wherein each gripper arm includes two parallel links, each parallel link being connected pivotally at a first end to the base element and at a second end to a gripper finger via swivel joints so that the links form a parallel guide for the gripper fingers.

2. The device according to claim 1, wherein the motor is fixed to the base element.

3. The device according to claim 1, wherein one of the links of the gripper arm is connected at opposite ends to the base element and to the gripper finger via two coaxial swivel joints, the axes of said two coaxial swivel joints being oriented tangentially to the center axis of the gripper.

4. The device according to claim 1, wherein the rotatable disc is mounted on the base element via a four-point antifriction bearing.

5. The device according to claim 1, wherein the gripper fingers include retaining plates parallel to the center axis of the gripper so as to contact a tread of a pneumatic tire, and contact surfaces arranged in a common radial plane to support the gripper fingers on a side wall of a pneumatic tire.

* * * * *